April 9, 1929.  W. S. LOWE  1,708,890
EGG SHIPPING PACKAGE
Filed April 28, 1927  2 Sheets-Sheet 1

INVENTOR
W. S. Lowe
BY
ATTORNEY

April 9, 1929.  W. S. LOWE  1,708,890
EGG SHIPPING PACKAGE
Filed April 28, 1927  2 Sheets-Sheet 2
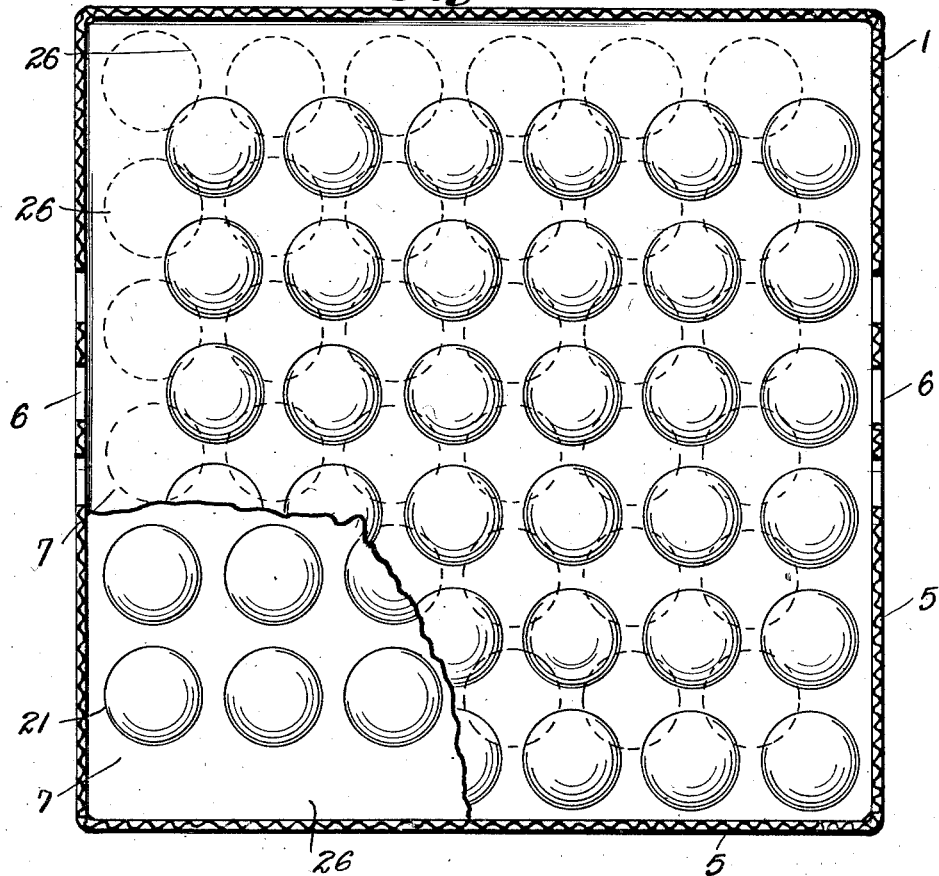
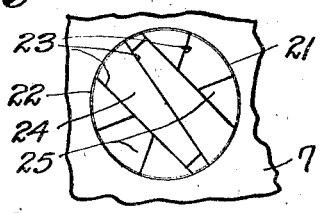
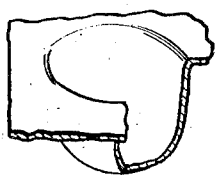
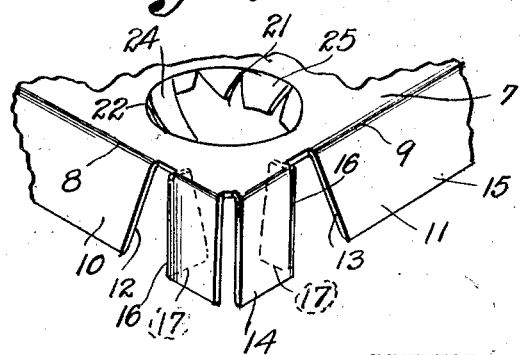
INVENTOR
W. S. Lowe.
BY
ATTORNEY

Patented Apr. 9, 1929.

1,708,890

UNITED STATES PATENT OFFICE.

WILLIAM S. LOWE, OF LAWRENCE, KANSAS.

EGG-SHIPPING PACKAGE.

Application filed April 28, 1927. Serial No. 178,192.

My invention relates to egg cases and more particularly to units comprising a box or container and the fillers or trays for safely packing the eggs in the box.

My purpose is to provide a case having fillers so constructed as to receive and support safely a larger number of eggs in a specific cubic space, or the converse, than is generally practicable with present facilities. The result of such a provision would be greatly increased economy in the shipping and the storage of eggs and in the supplies necessary therefor.

The usual wooden egg case for shipping has two compartments, each compartment having five layers of eggs positioned on end. The eggs are packed in and are held erect by fillers consisting of nests of rectangular boxes, one for each egg, formed of joined slit strips. Sheets or division boards provide the floors for the egg layers, each layer containing usually three dozen eggs disposed in six rows. In unpacking a case the top of the box is removed, the top filler is elevated, releasing the eggs from the pockets in which they had been held erect. The clutch of three dozen eggs is therefore loosely dispersed on the division board, and gathered. The next division board is removed, and the next filler with its three dozen compartments is raised, the next layer of eggs is ready for removal. It is apparent that the height of an egg case represents the total length of the eggs in the layers plus the division boards and plus any packing boards above and below.

I accomplish my purpose of reducing the space required for packing a specific number of eggs by providing a device reducing by substantially one-half the vertical space required for packing the prescribed number. An important feature of my device is the construction of trays to hold the eggs having depending peripheral spacing flanges and pockets to receive the eggs, alternate trays in a case being so disposed that the eggs of adjacent trays are staggered with reference to each other. In a packed case of my design, eggs of a superposed tray rest between the eggs of the tray below and are supported in part by the resting of their points on the body of the lower tray. Thus I dispense with the division board and provide for a total vertical space for a series of layers equal to substantially half the total egg height of a case.

My design and invention are possible for two reasons. First, because of the pointed shape of an egg which permits the nesting that I suggest, and second, the requirement of individual protective housings or pockets in a case for eggs.

My device will be more specifically described with references to the drawings in which:

Fig. 2 is a plan view of filler elements.

Fig. 3 is a detail fragmentary view of a pocket adapted to receive an egg.

Fig. 4 is a fragmentary view of a corner of a tray shaped for positioning in a case and the pocket element shaped as receiving an egg.

Fig. 5 is a detail view of a pocket of a modified form of tray, parts being broken away to shown its structure.

Figure 1:
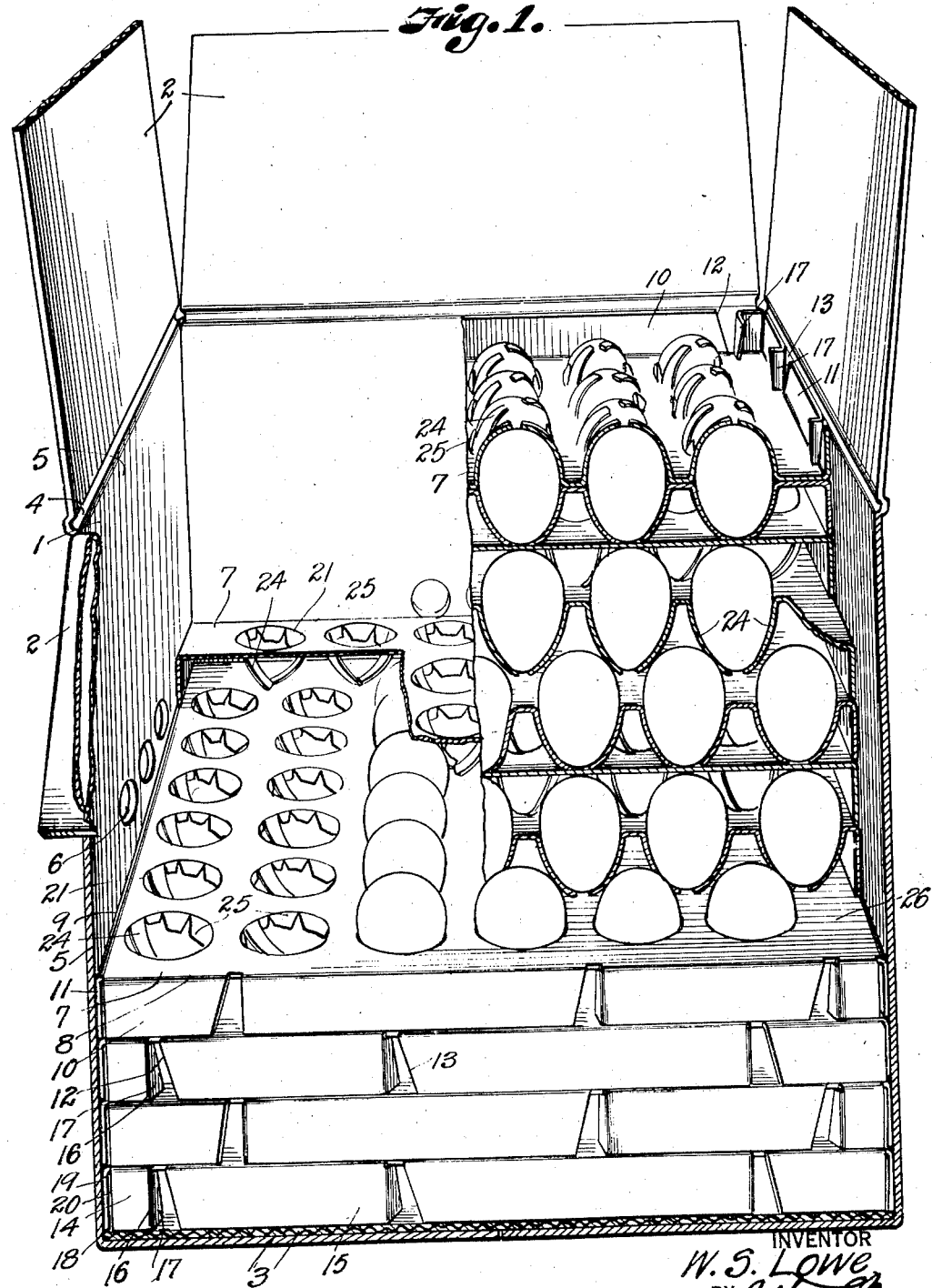
Fig. 1 is a perspective view of an egg case equipped with fillers of my design.

Referring in detail to the drawings:

1 designates an egg case or container which may be of any material but which is shown as of corrugated fiber board having top leaves 2 and the lower or bottom leaves 3 hinged by flexible means 4 as usual in the construction of such boxes to the sides 5. The case of my preferred package is substantially square in cross section. Openings 6 are provided in the sides for receiving the fingers of a handler. 7 designates a tray or filler element of my design and a box or case is provided having dimensions appropriate to the particular type of tray that it may be designed to receive as will be described, and preferably to hold a single tier or series of egg trays.

The tray 7 consists of a sheet of material, preferably a fiber board, or a paper or box board, having an area in excess of the lateral dimension of the case. I may mould a tray and in that way confer its various features, but I prefer to show now the sheet mentioned.

The sheet is scored on lines suggested by the designations 8 and 9 spaced from the periphery of the sheet substantially half the long diameter of an egg whereby a depending wing or flange such as 10 and 11 may be produced by bending the sheet on the scored lines. It is understood that there are four such flanges available on each sheet to constitute the upholding and layer-spacing elements of the assembly. The flanges are angularly slit as at 12 and 13 upon preparation of the sheet to provide portions such as 14 and 15 constituting the supporting elements for a tray as positioned on the bottom of a case or upon a tray below. Scorings are provided suggested by 16 whereby a supporting member 15 is provided with an inwardly bent ear 17, the ears when effectively produced being designed to retain a tray against slipping which might be possible from the entering of the flange edge between the wall of the case and the edge of a lower tray. The flanges are further cut and portions cut out to produce the corner opening 18 and the free edges such as 19 and 20 of supporting members adjacent a corner of a tray.

The surface area of a positioned tray is provided with a plurality of openings produced to constitute pockets 21 for eggs, and these may be of certain numbers as desired for a particular shipping purpose. For convenience I have illustrated a tray as being provided with thirty-six of such pockets and will later refer to trays having a different number. The pockets 21 are constructed to admit the small ends of eggs and to retain the eggs half depending, spaced so that eggs deposited therein will be slightly spaced from each other and no parts of eggs will touch. The form of a pocket is prescribed by scoring of circular outlines indicated by 22, to assure the exact and efficient positioning of an egg in a pocket, and the area within such circular outline is slit at 23, to permit displacement of tray material by an egg introduced, and is provided with jointed or hinged fingers 24 and tabs 25 produced in the sheet by the scoring and slitting, the fingers 24 being designed of lengths slightly more than half the length of an egg so that the lower end of a finger will rest upon a lower tray and assist in supporting the portion of tray in which the pocket of the finger is produced, the two fingers of a pocket therefore serving to support the egg contained by the pocket and to provide a shield between the supported egg and the eggs of the tray below.

In the ordinary egg case package, the eggs of one layer are vertically disposed above the eggs of the layer below for economical packing and supply of materials. My purpose is to pack the eggs with the lower portions of the eggs of an upper layer disposed among the upper portions of the eggs of a lower layer. I accomplish this particular object by providing a blank border 26 on two adjacent edges of a tray surface, which may be suggestively described as an extra spacing of approximately one and one-fourth inches between a row of eggs and the parallel border of the tray. The blank spaces that are thus produced enable me to position a tray upon another tray in such a manner that the lower ends of the eggs of the upper tray are suspended between the upper ends of the eggs of the lower tray, the depending fingers protecting the eggs, as shown in Fig. 1; this being practically possible by setting the superposed tray with its blank-space edges positioned over the unspaced edges of the tray below.

It may be noted in the figures that each tray fits snugly into the case and is supported by the extending peripheral flanges upon a lower tray or the bottom of the box, whereby any number of layers of vertically positioned eggs occupy a vertical space substantially equal to one-half the space required for the same number of eggs in ordinary packing practice and with the usual filler or pocket tray devices, that is to say, one-half such space plus 1¼ inches upward projection of the top layer; and a horizontal excess of dimension represented by the blank edges 26 becomes negligible in view of the fact that it is measured against the lateral diameter of the egg.

It is obvious, therefore, that with my device a larger number of eggs may be packed in substantially the cubic space heretofore required for a selected number.

While I have indicated trays designed for thirty-six eggs, I suggest also that trays may be provided adapted to fit into a space constructed for the usual arrangement of eggs, in which circumstance I would provide for twenty-five eggs in each tray, the blank spaces provided for my design taking up the horizontal area of one row of eggs in a layer.

I point out that with my arrangement an egg case adapted to contain thirty-dozen eggs by ordinary packing methods, may by the provision of my device be enabled to contain five hundred eggs.

In practice, however, the package containing thirty dozen eggs is the maximum for safe shipping and for convenient handling both for distribution and in storage. I therefore contemplate the use of my device in the maximum package of thirty dozen, which would represent the same vertical measure as for an ordinary thirty dozen case but substantially one-half the horizontal measure. The saving of storage space is obvious as well as the increased safety of handling because of the smaller and more compact package and the opportunity to provide containers of materials that may the more positively protect the eggs.

It is in connection with the storage particularly that I wish to call attention to the container or case features of my invention, indicating the manner in which the container and the fillers or trays co-operate to produce the desired and improved shipping and packing unit which I offer.

The openings which for shipping purpose provide the finger holds for lifting the case, constitute ventilating apertures for a filled case put into storage. In case I wish to produce my container of fiber board, pulp board or corrugated straw board material, the walls and connected edges of the container will be substantially air and gas tight as well as protective against damage from contact, and the ventilating apertures will therefore be useful in the provision of circulating air to the interior of the cases in storage. I point out particularly that the ventilating provision of my case and its type of tray is important and is especially considered in view of the comparative sealing of eggs in the ordinary type of filler and case. The box-like pockets of ordinary fillers and the division boards that support the fillers constitute substantially air tight walls to seal eggs against ventilation while in storage. The result is deprivation of refrigeration, as well as the withholding of aeration. Air, however, may circulate freely between the two adjacent parallel walls of plane surfaces of my tray, and air may circulate among the trays through the apertures produced by the provision of slitted supports and inturned ears of my downturned flanges. Air, therefore, is admitted through the finger hole apertures and circulates throughout the case, having egress as well as ingress, and is sufficiently baffled so that it does not keep and maintain a single narrow course through a case. I point out this result of provision for adequate and desirable ventilation as attained by the structure that I have described whereby my arrangement for the economical use of space and also for the adequate protection of the eggs against damage is attained.

I wish to point out also that my structure further provides for the unpacking of a case with convenience and expedition. It is to be noted that my arrangement provides for installing the eggs into pockets supporting them through the top of a case. I may install upon the topmost layer an inverted tray the pockets of which may be provided with a protective lining, to brace the top layer of eggs and also to constitute an inverted pocket tray. When the case is to be unpacked, a tray may be inverted and the bottom may be opened exposing the bottom of a tray, that is, the under surface of the packed tray. This tray may be removed, being lifted easily from the pointed ends of the eggs that have been inserted into it, and the eggs will then be loosely disposed in a clutch so that they may be gathered by hand. The next tray may be then removed in like manner, so that the unpacking of a case of eggs equipped with my trays is effected in much the same manner as in the circumstance of a case equipped with the ordinary filler.

Cases having filling trays of my design are adapted for construction of materials whereby various protective and especially waterproofing features may be applied. For example, the outside liner of the case may be a waterproof fabric and chip board may be used as an interliner, and various other features may be easily applied on the basis of my invention as comprising a fiber or like box and the trays with their pockets.

While I have described the egg trays of my device as constructed of board scored to produce flanges and fingers, and have referred to fibre containers, I wish it understood that wooden boxes, pressed or moulded trays, and similar changed details and processes may be used without departing from the spirit of my invention. I may provide fillers of any material, size and proportions to be used in cases of one or another kind, the fillers adapted to pack the eggs in such a way that substantially half the length of the eggs on one tray depends among the upper halves of eggs of a lower tray. I then may further provide that the depending portions of eggs may be partly supported and protected by means preferably integral with the trays. This I accomplish through my wider margins of adjacent edges of trays.

What I claim and desire to secure by Letters Patent is:

1. A tray for packages of the character described comprising a body portion having article-receiving pockets and having longitudinally scored edge portions transversely slit and scored intermediately of their ends for extension from the edge portions to form stabilizing legs when the edge portions are bent at right angles to the body portion, said transverse slits and scorings intersecting the first named scorings at spaced points to provide legs having horizontal upper edges of appreciable length for engaging the body portion to support the same.

2. A package of the character described comprising a container, and a plurality of trays in the container, each tray comprising a sheet having downturned edge flanges, forming rails for supporting one sheet upon another, said flanges being slit and scored transversely intermediately of their ends and portions between adjacent slits and scorings being slit from the sheets for turning beneath the sheets to form stabilizing legs having straight upper edges of appreciable length for supporting portions of the sheet adjacent the flanged edges thereof.

3. A tray for packages of the character described comprising a sheet having scores to provide edge rails; the sheet having corner openings and the ends of the rails being reduced to produce free corner-supporting portions, the rails having transverse slits and scorings intersecting the rail scores at appreciably spaced points for providing straight top edges for rail portions between related slits and scorings, said portions being severed from the sheet on the edge rail scores for inbending to engage the under surface of the sheet to support the same.

4. A tray for packages of the character described, comprising a body portion having depending edge rails and circular scores defining article-receiving pockets, the material within the pocket areas having slits on chords of the scored area, the portions between adjacent slits having transverse divisions offset from the center of the area whereby divided portions are constituted, wings having differential length, the pockets having a diameter greater than the width of said rails, and selected wings having length substantially equal to the width of the rails and adapting them for supporting the tray.

In testimony whereof I affix my signature.

WILLIAM S. LOWE.